(12) United States Patent
Aiso

(10) Patent No.: US 10,969,278 B2
(45) Date of Patent: Apr. 6, 2021

(54) SPECTROSCOPIC INSPECTION METHOD, IMAGE PROCESSING APPARATUS, AND ROBOT SYSTEM

(71) Applicant: Seiko Epson Corporation, Tokyo (JP)

(72) Inventor: Seiji Aiso, Shiojiri (JP)

(73) Assignee: Seiko Epson Corporation

( * ) Notice: Subject to any disclaimer, the term of this patent is extended or adjusted under 35 U.S.C. 154(b) by 0 days.

(21) Appl. No.: 16/798,791

(22) Filed: Feb. 24, 2020

(65) Prior Publication Data

US 2020/0271519 A1 Aug. 27, 2020

(30) Foreign Application Priority Data

Feb. 25, 2019 (JP) ............................. JP2019-031339

(51) Int. Cl.
*G01J 3/28* (2006.01)
*G06T 7/00* (2017.01)

(52) U.S. Cl.
CPC ............ *G01J 3/2823* (2013.01); *G06T 7/001* (2013.01); *G01J 2003/2826* (2013.01); *G06T 2207/10036* (2013.01)

(58) Field of Classification Search
CPC .... G01J 3/02; G01J 3/28; G01J 3/2803; G01J 3/10; G01J 3/2823
USPC ....................................................... 356/326
See application file for complete search history.

(56) References Cited

U.S. PATENT DOCUMENTS 9,984,307 B2 * 5/2018 Kato ...................... G01J 3/465
2016/0069743 A1 * 3/2016 McQuilkin ............ A22B 5/007
356/416

FOREIGN PATENT DOCUMENTS

JP 2015-203586 A 11/2015

* cited by examiner

*Primary Examiner* — Md M Rahman
(74) *Attorney, Agent, or Firm* — Harness, Dickey & Pierce, P.L.C.

(57) ABSTRACT

A spectroscopic inspection method is a spectroscopic inspection method of performing an inspection using a spectral image, including an imaging step of executing imaging processing of imaging an object within an imaging range of a spectral camera using the spectral camera and acquiring the spectral image, an inspection step of executing inspection processing of executing imaging processing on the spectral image and outputting a result of the image processing as an inspection result, a signal transmission step of executing transmission processing of transmitting a signal for operation of the object based on the inspection result, and a setting step of setting a work procedure of the imaging processing, the inspection processing, and the signal transmission processing, wherein the setting step sets the work procedure to execute the inspection step after the imaging step ends and execute the signal transmission step after the imaging step ends and before the inspection step ends.

10 Claims, 11 Drawing Sheets

ACCEPTABLE PRODUCT

REJECTABLE PRODUCT

SPECTROSCOPIC INSPECTION METHOD, IMAGE PROCESSING APPARATUS, AND ROBOT SYSTEM

The present application is based on, and claims priority from JP Application Serial Number 2019-031339, filed Feb. 25, 2019, the disclosure of which is hereby incorporated by reference herein in its entirety.

BACKGROUND

1. Technical Field

The present disclosure relates to a spectroscopic inspection method, image processing apparatus, and robot system.

2. Related Art

In related art, in color detection in robot vision, an object detection based on colors or an inspection based on colors may be performed using a color camera in a production unit. Red and blue parts can be distinguished by the camera and sorted by a robot, and only an acceptable product through an inspection as to whether or not a blue part is reliably attached to a part can be passed to the next step.

A spectral camera is a camera that may capture spectral luminance on a two-dimensional plane. With the spectral camera, a color unevenness inspection of distinguishing slight color differences, which is impossible for a general camera using an RGB area sensor, can be performed.

For example, as an inspection apparatus for the purpose of detection of defective products including different types of products as objects to be inspected, a method of analyzing a spectral image obtained by imaging of the object to be inspected with the spectral camera is studied (for example, see JP-A-2015-203586).

However, in the method of analyzing the spectral image obtained by imaging of the object to be inspected, the imaging and the inspection respectively take time and the next step should wait until an inspection result is obtained. Thereby, the takt time of the inspection apparatus may be longer.

SUMMARY

A spectroscopic inspection method according to this application is a spectroscopic inspection method of performing an inspection using a spectral image of an object captured by a spectral camera, including an imaging step of imaging the object within an imaging range of the spectral camera using the spectral camera and acquiring the spectral image, an inspection step of executing image processing on the spectral image and outputting a result of the image processing as an inspection result, a signal transmission step of transmitting a signal for operation of the object based on the inspection result, and a setting step of setting a work procedure of the imaging step, the inspection step, and the signal transmission step, wherein the setting step sets the work procedure to execute the inspection step after the imaging step ends and execute the signal transmission step after the imaging step ends and before the inspection step ends.

The spectroscopic inspection method may further include a teaching step of receiving teaching of reference spectral data used for the image processing in advance, wherein the inspection step may output a difference between the spectral image and the reference spectral data as the inspection result.

In the spectroscopic inspection method, the reference spectral data may include threshold values for respective wavelengths contained in the spectral image, and the inspection step may output a result of a judgement based on a sum of differences between spectral luminance and the threshold values for the respective wavelengths contained in the spectral image as the inspection result.

In the spectroscopic inspection method, the reference spectral data may include a plurality of wavelengths contained in a visible light wavelength band.

In the spectroscopic inspection method, the image processing may include processing of creating a grayscale image from the spectral image and setting the image as a representative image.

In the spectroscopic inspection method, the image processing may set a predetermined coordinate system in the representative image and output a difference between a spectrum of a pixel in a position based on the coordinate system and the reference spectral data as the inspection result.

In the spectroscopic inspection method, the reference spectral data may include threshold values for respective wavelengths contained in the spectral image, and the image processing may extract pixels having the spectra smaller than the threshold values as an extracted area, and output the extracted area based on the coordinate system of the representative image as the inspection result.

In the spectroscopic inspection method, the image processing may output shape information of the extracted area as the inspection result.

An image processing apparatus according to this application is an image processing apparatus that performs an inspection using a spectral image of an object captured by a spectral camera, including an imaging unit control part that executes imaging processing of imaging the object within an imaging range of the spectral camera using the spectral camera and acquiring the spectral image, an inspection part that executes inspection processing of executing image processing on the spectral image and outputting a result of the image processing as an inspection result, a communication unit that executes transmission processing of transmitting a signal for operation of the object based on the inspection result, and a setting part of setting a work procedure of the imaging processing, the inspection processing, and the transmission processing, wherein the setting part sets the work procedure to execute the inspection processing after the imaging processing ends and execute the transmission processing after the imaging processing ends and before the inspection processing ends.

A robot system according to this application includes a robot, the above described image processing apparatus, and a control apparatus that controls the robot based on the inspection result of the image processing apparatus.

DESCRIPTION OF EXEMPLARY EMBODIMENTS

As below, an embodiment of the present disclosure will be explained with reference to the drawings. Note that the drawings to be used are appropriately enlarged or reduced so that the parts to be explained can be recognized.

Robot Vision System

Figure 1:
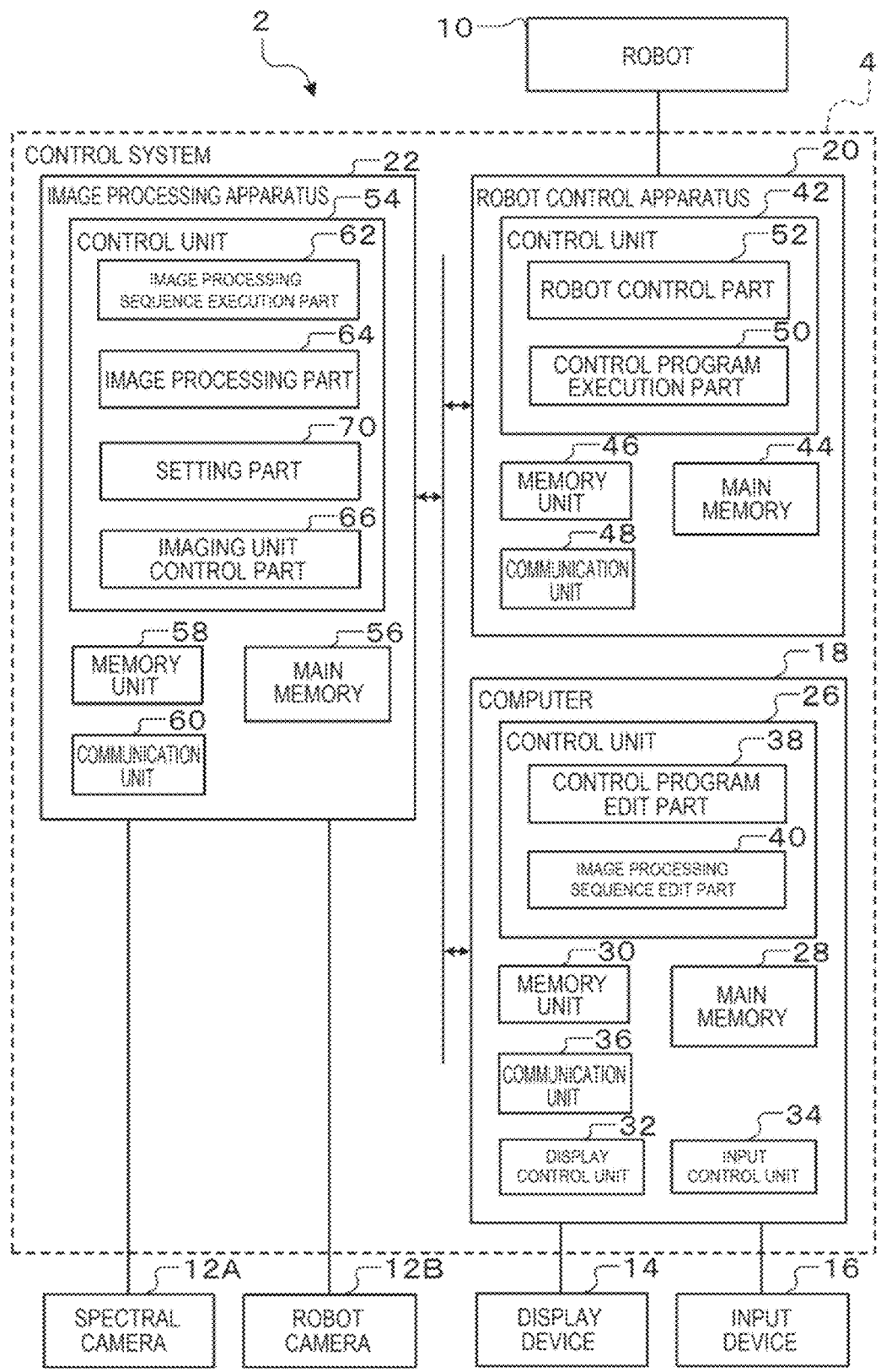
FIG. 1 is a system configuration diagram showing a robot vision system according to an embodiment.

FIG. 1 is the system configuration diagram showing the robot vision system according to the embodiment.

A robot vision system 2 as the robot system according to the embodiment is e.g. an apparatus used for work of holding, conveying, assembly, inspections, etc. of works W as objects including electronic components and electronic apparatuses.

As shown in FIG. 1, the robot vision system 2 includes a control system 4, a robot 10, a spectral camera 12A, a robot camera 12B, a display device 14, and an input device 16.

The control system 4 includes a computer 18, a robot control apparatus 20, and an image processing apparatus 22.

The computer 18, the robot control apparatus 20, and the image processing apparatus 22 are connected via wired or wireless communication (hereinafter, simply referred to as "connected") to one another. The display device 14 and the input device 16 are respectively connected to the computer 18 via wired or wireless communication. The robot 10 is connected to the robot control apparatus 20 via wired or wireless communication. The spectral camera 12A and the robot camera 12B are respectively connected to the image processing apparatus 22 via wired or wireless communication. Note that the spectral camera 12A, the robot camera 12B, the display device 14, and the input device 16 may be respectively connected to the image processing apparatus 22.

In the robot vision system 2, for example, under control of the control system 4, the spectral camera 12A and the robot camera 12B image the work W or the like and the robot 10 performs work on the work W or the like based on the captured images captured by the spectral camera 12A and the robot camera 12B. Further, under control of the control system 4, the robot vision system 2 performs e.g. creation of an image processing sequence for recognition of the work W by the spectral camera 12A and the robot camera 12B or the like and performs calibration for associating an imaging coordinate system with a robot coordinate system so that the robot 10 may perform appropriate work.

As below, the respective parts forming the robot vision system 2 will be explained.

Robot

The robot 10 is coupled to the robot control apparatus 20. The type of the robot 10 that can be coupled to the robot control apparatus 20 is not particularly limited, but includes e.g. a vertical articulated robot and horizontal articulated robot. Here, "horizontal articulated robot" refers to a robot having an arm acting in horizontal directions. Further, "vertical articulated robot" refers to a robot having three or more axes and two axes of the three axes cross each other.

Camera

Figure 10:
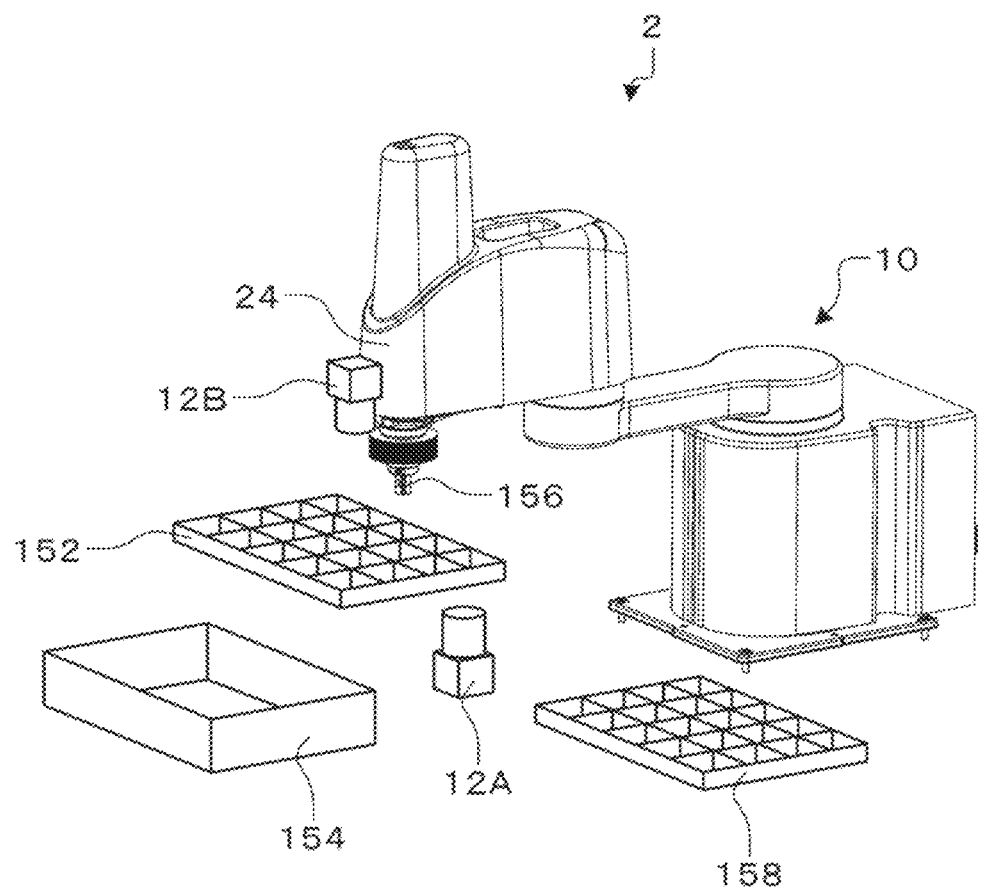
FIG. 10 is a placement diagram showing a system for sorting works into acceptable products and rejectable products.

The spectral camera 12A and the robot camera 12B are respectively coupled to the image processing apparatus 22. In the embodiment, as shown in FIG. 10 to be described later, the robot vision system 2 includes the spectral camera 12A placed around the robot 10 and the robot camera 12B fixed to a robot arm 24 of the robot 10. Note that the robot camera 12B is attached to the distal end portion of the robot arm 24.

Display Device

The display device 14 includes a monitor of e.g. a liquid crystal display or the like and has a function of displaying e.g. the captured images captured by the spectral camera 12A and the robot camera 12B, various windows, etc. The various images are e.g. operation windows and windows relating to processing results. Therefore, a user may grasp the captured images, work by the robot 10, etc.

Input Device

The input device 16 includes e.g. a mouse, keyboard, etc. Therefore, the user operates the input device 16, and thereby, may give instructions of various kinds of processing etc. to the control system 4.

Note that, in the embodiment, in place of the display device 14 and the input device 16, a display input device serving as both the display device 14 and the input device 16 may be provided. As the display input device, e.g. an electrostatic touch panel, pressure-sensitive touch panel, or the like as a touch panel may be used. The input device 16 may have a configuration that recognizes sound including voice.

Control System

As described above, the control system 4 includes the computer 18, the robot control apparatus 20, and the image processing apparatus 22. The control system 4 controls driving of the robot 10, the spectral camera 12A, the robot camera 12B, and the display device 14.

As below, the computer 18 and the robot control apparatus 20 of the control system 4 will be sequentially explained.

Computer

The computer 18 includes e.g. a computer (e.g. PC (Personal Computer), PLC (Programmable Logic Controller), or the like) in which a program (OS: Operating System) is installed. The computer 18 includes e.g. a CPU (Central Processing Unit) and a GPU (Graphics Processing Unit) as processors, a RAM (Random Access Memory), and a ROM (Read Only Memory) in which programs are stored.

As below, the respective functions of the computer 18 will be explained.

The computer 18 includes a control unit 26, a main memory 28, a memory unit 30, a display control unit 32, an input control unit 34, and a communication unit 36, and is configured to exchange data among the units.

The function of the control unit 26 may be realized by e.g. execution of various programs stored in the main memory 28 and the memory unit 30 using the CPU and the GPU. The control unit 26 includes e.g. a control program edit part 38 and an image processing sequence edit part 40. Note that the functional parts of the control unit 26 are not limited to those. One of these functional parts may be omitted or another functional part may be added.

The control program edit part 38 creates and edits the control program for driving the robot 10 including work programs for the robot 10 to perform various kinds of work. For example, the control program edit part 38 may designate various commands having predetermined arguments in the control programs.

The image processing sequence edit part 40 creates and edits an image processing program relating to the image processing sequence for recognition of the work W by the spectral camera 12A and the robot camera 12B. That is, the image processing sequence edit part 40 has a function of editing details of settings on the image processing sequence.

In addition, the control unit 26 performs various calculations according to the instructions by the user received in the input control unit 34, makes judgments, and gives instructions to the respective functional units of the computer 18, instructions to the robot control apparatus 20, and instructions to the image processing apparatus 22, etc.

The main memory 28 is a work area of the control unit 26. The function of the main memory 28 may be realized by e.g. the RAM.

The memory unit 30 has a function of recording various kinds of data including programs. The function of the memory unit 30 may be realized by the ROM or the like or the so-called external memory device. The memory unit 30 stores software including e.g. the image processing program relating to the image processing sequence for recognition of the work W by the spectral camera 12A and the robot camera 12B etc., e.g. robot control program development software. In other words, the above described software is installed in the computer 18. Further, the software includes programs relating to tool settings, programs relating to local settings, programs for execution of various kinds of processing for driving various robots 10 by various commands and creation and execution of the image processing sequences, etc., and programs for setting various parameters in force control based on output from a force detection unit (not shown). The above described software may be stored in a recording medium of e.g. a CD-ROM or the like and provided from the recording medium, or provided via a network.

The display control unit 32 is coupled to the display device 14 and has a function of displaying the captured images and various windows on the monitor of the display device 14. The various windows are e.g. operation windows and windows relating to processing results. That is, the display control unit 32 controls driving of the display device 14. The function of the display control unit 32 may be realized by e.g. the GPU. For example, the display control unit 32 sequentially displays a plurality of guide windows relating to the image processing sequence interactively with the user on the display device 14. Further, the display control unit 32 sequentially displays a plurality of calibration creation windows relating to calibration, a plurality of tool setting windows relating to tool settings, and a plurality of local setting windows relating to settings of the local coordinate system interactively with the user on the display device 14.

The input control unit 34 is coupled to the input device 16 and has a function of receiving input from the input device 16. The function of the input control unit 34 may be realized by e.g. an interface circuit. Note that, when e.g. a touch panel is used, the input control unit 34 has a function of an input sensing unit that senses contact of the user's finger with the touch panel or the like.

The communication unit 36 has a function of exchanging data with an external unit including the robot control apparatus 20, image processing apparatus 22 or the like. The function of the communication unit 36 may be realized by e.g. an interface circuit or the like.

Robot Control Apparatus

The robot control apparatus 20 controls driving of the robot 10 according to e.g. an instruction from the computer 18. The robot control apparatus 20 is a computer in which the programs including the OS are installed. The robot control apparatus 20 includes e.g. a CPU as a processor, a RAM, and a ROM in which the programs are stored.

As below, the respective functions of the robot control apparatus 20 will be explained.

The robot control apparatus 20 includes a control unit 42, a main memory 44, a memory unit 46, and a communication unit 48, and is configured to exchange data among the units.

The function of the control unit 42 may be realized by e.g. execution of various programs stored in the main memory 44 and the memory unit 46 by the CPU. The control unit 42 includes e.g. a control program execution part 50 and a robot control part 52. Note that the functional parts of the control unit 42 are not limited to those. One of these functional parts may be omitted or another functional part may be added.

The control program execution part 50 executes the control program for driving the robot 10 according to the instruction from the computer 18. For example, the control program execution part 50 executes various kinds of processing on the robot 10 using various commands. The various kinds of processing includes e.g. tool settings, local settings, calibration processing, image processing sequence execution instructions, etc.

The robot control part 52 controls driving of the respective drive units to drive and stop the robot arm 24. For example, the control unit 42 derives target values of motors provided in the respective drive units for moving the hand to a target position based on information output from a position sensor and the force detection unit (not shown). In addition, the control unit 42 has a function of performing processing including various calculations and judgements, a function of giving instructions of the robot control apparatus 20, etc.

The main memory 44 is a work area for the control unit 42. The function of the main memory 44 may be realized using e.g. the RAM.

The memory unit 46 has a function of recording various kinds of data including programs. The memory unit 46 records e.g. control programs etc. The function of the memory unit 46 may be realized using the ROM or the like or the so-called external memory device.

The communication unit 48 has a function of exchanging data with an external unit including the robot 10, the computer 18, the image processing apparatus 22, etc. The function of the communication unit 48 may be realized using e.g. an interface circuit or the like.

Image Processing Apparatus

The image processing apparatus 22 according to the embodiment is an image processing apparatus that performs an inspection of the work W contained in the spectral image captured by the spectral camera 12A. For example, the image processing apparatus 22 controls driving of the spectral camera 12A and the robot camera 12B according to the instruction from the computer 18 and performs processing of the captured images captured by the spectral camera 12A and the robot camera 12B. The image processing apparatus 22 is e.g. a computer in which programs including the OS etc. are installed. The image processing apparatus 22 includes e.g. a CPU and a GPU as processors, a RAM, and a ROM in which the programs are stored.

As below, the respective functions of the image processing apparatus 22 will be explained.

The image processing apparatus 22 includes a control unit 54, a main memory 56, a memory unit 58, and a communication unit 60 as a signal transmission unit, and is configured to exchange data among the units.

The function of the control unit 54 may be realized by e.g. execution of various programs stored in the main memory 56 and the memory unit 58 by the CPU and the GPU. The control unit 54 includes an image processing sequence execution part 62 as an inspection part, a setting part 70, an image processing part 64, and an imaging unit control part 66. Note that the functional parts of the control unit 54 are not limited to those. Any of these functional parts may be omitted or another functional part may be added.

The image processing sequence execution part 62 has a function of executing the image processing sequence according to the instruction from the computer 18. Further, the image processing sequence execution part 62 has a function as the inspection part of capturing a spectral image, executing image processing on the image, and outputting a result of the image processing as an inspection result.

The setting part 70 sets execution of the spectral camera 12A and execution of the image processing sequence execution part 62 as one work procedure. After the spectral camera 12A ends, the setting part 70 sets a work procedure to execute the communication unit 60 at the same time with the execution of the image processing sequence execution part 62. The setting part 70 sets a work procedure to execute the communication unit 60 of transmitting a signal for operation of the work W at the same time with the execution of the image processing on the spectral image in the image processing sequence execution part 62.

The image processing part 64 has a function of performing image processing of e.g. extraction of various kinds of information from the captured images. Specifically, the image processing part 64 performs processing including various calculations and various judgements based on e.g. the captured images from the spectral camera 12A and the robot camera 12B etc. For example, the image processing part 64 calculates coordinates of an object to be imaged in an image coordinate system based on the captured images. Further, for example, the image processing part 64 transforms the coordinates in the image coordinate system into coordinates in a distal end coordinate system of the robot 10 or coordinates in a base coordinate system of the robot 10. Correction parameters used for the transformation are obtained by e.g. the computer 18 or the robot control apparatus 20. Note that the image processing apparatus 22 may obtain correction parameters used for the transformation.

The imaging unit control part 66 acquires a spectral image by imaging of the work W using the spectral camera 12A when the work W is located within an imaging range of the spectral camera 12A. For example, the imaging unit control part 66 has a function of controlling driving of the spectral camera 12A and the robot camera 12B and acquiring captured images from the spectral camera 12A and the robot camera 12B.

In addition, the control unit 54 has a function of performing processing including various calculations and judgements in response to instructions from the computer 18, a function of giving instructions to the respective functional units of the image processing apparatus 22, etc.

The main memory 56 is a work area for the control unit 54. The function of the main memory 56 may be realized using e.g. the RAM.

The memory unit 58 has a function of recording various kinds of data including programs. The memory unit 58 records e.g. programs on the image processing sequences etc. The function of the memory unit 58 may be realized using the ROM or the like or the so-called external memory device.

The communication unit 60 has a function of exchanging data with an external unit including the spectral camera 12A, the robot camera 12B, the robot control apparatus 20, the computer 18, etc. The communication unit transmits signals for operation on the work W. The function of the communication unit 60 may be realized using e.g. an interface circuit or the like.

As above, the configuration and the function of the control system 4 are explained. Note that the respective functions of the above described computer 18, robot control apparatus 20, and image processing apparatus 22 may be provided in any of the computer 18, the robot control apparatus 20, and the image processing apparatus 22. Or, the computer 18, the robot control apparatus 20, and the image processing apparatus 22 may be integrally formed. For example, the image processing sequence execution part 62, the image processing part 64, and the imaging unit control part 66 provided in the image processing apparatus 22 may be provided in the control unit 26 of the computer 18. Or, the display control unit 32 and the input control unit 34 provided in the computer 18 may be provided in the image processing apparatus 22. Or, the control system 4 does not necessarily have the image processing apparatus 22 and, in this case, the respective functions of the image processing apparatus 22 may be provided in the computer 18.

As above, the basic configuration of the robot vision system 2 is briefly explained.

As below, specific examples of the processing performed by the image processing apparatus 22 will be explained.

Example 1

Robot Control Program Development Software

Here, a window for image processing is explained.

Figure 2:
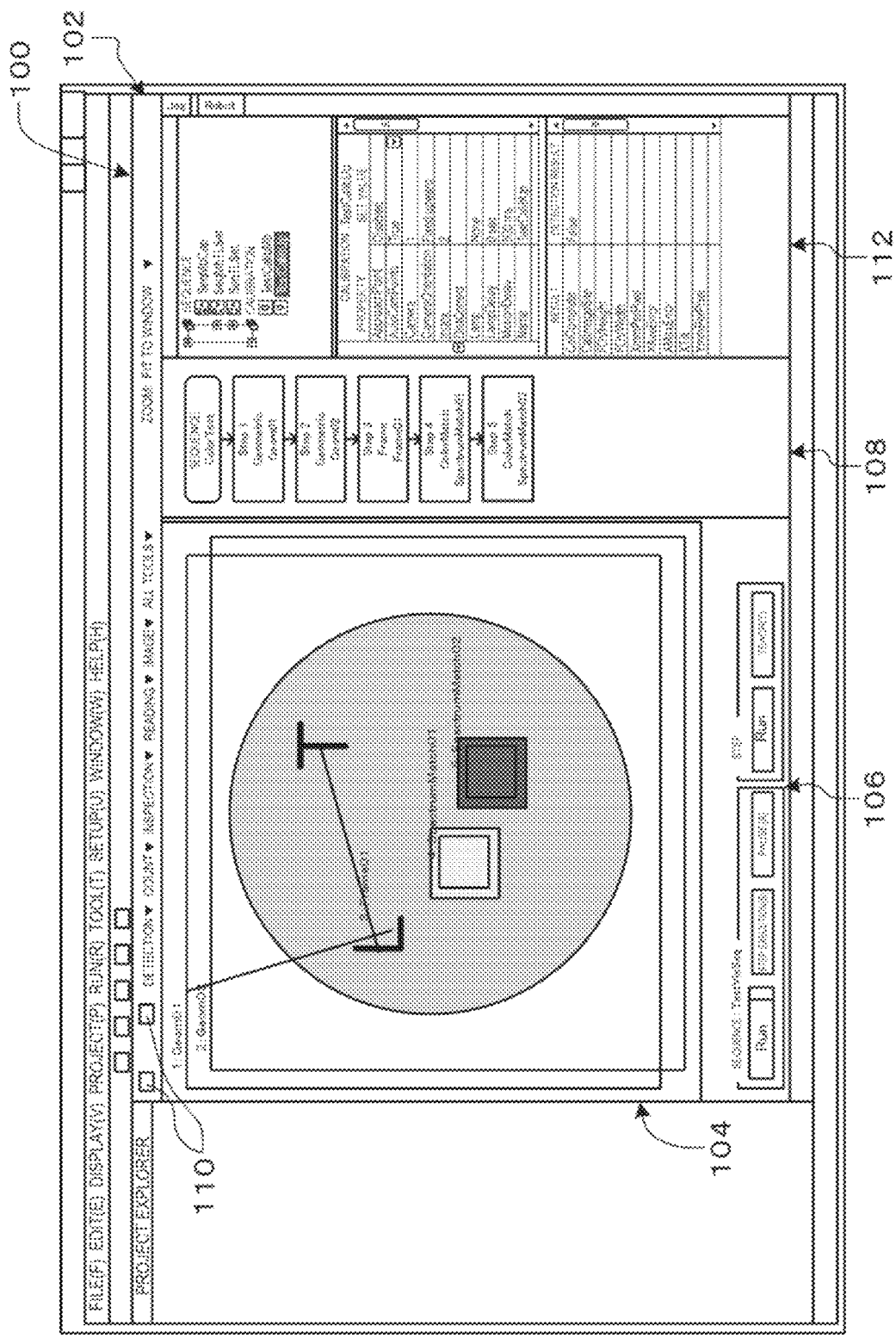
FIG. 2 shows examples of a setting window, an image processing sequence, and image processing objects of the robot vision system.

FIG. 2 shows the examples of the setting window, the image processing sequence, and the image processing objects of the robot vision system.

As shown in FIG. 2, a window 100 for image processing includes a toolbar 102, an image display section 104, an execution group 106, and a flowchart display section 108. The window 100 for image processing is displayed by the user operating and instructing an icon on a main window (not shown).

The toolbar 102 includes icons 110 used for displaying a window group for creation of the image processing sequence. The image display section 104 displays the captured images captured by the spectral camera 12A and the robot camera 12B and the image processing result. The execution group 106 includes various buttons for receiving operations and instructions for execution of the image processing sequence by the user. The flowchart display section 108 displays an image processing procedure of the image processing sequence, a teaching procedure of calibration, etc.

Further, the window 100 includes a property setting window 112 for calibration settings, image processing sequence settings, display, and edit.

As described above, the display control unit 32 may display a plurality of kinds of sub-windows to overlap or to arrange side by side at the same time with one main window under control of the control unit 26, and thereby, the user may efficiently perform a plurality of kinds of work.

Next, the image processing sequence and the image processing object in the above described work program will be explained.

The image processing sequence is usually used with the addition of one or more image processing objects. The image processing sequence enables designation and imaging settings of the spectral camera 12A. A normal black-and-white camera may be designated or the spectral camera 12A may be designated. In the case of the spectral camera 12A, a representative image is set, and the representative image is used for image processing on a grayscale image as an object.

The image processing objects are individual functions of image transform, detection of the work W in the image, and inspection using the image. Many image processing objects including an ImageOp object for image transform, a Geometric object for detection of the work W by a contour shape, a Correlation object for detection of the work W by a light and dark pattern, an Edge object for detection of a luminance change point on a search line, a SpectrumMatch object for spectroscopic inspection are prepared so that the user may freely choose the objects.

The image processing sequences and the image processing objects have many properties including parameters for image processing and determination threshold values for inspections and many results including processing results. The settings of the spectral camera 12A and the settings of the representative image are the properties of the image processing sequences.

The Geometric object is an image processing object for searching for the same shape as that of a preregistered model based on the contour. A model area is set and a teach button is pressed, and thereby, a model may be registered.

The SpectrumMatch object is an image processing object for inspection based on a difference from taught reference spectral data. The object has a threshold value of the difference in the property and a determination result in the result.

In this example, a position based on the Geometric object and a Frame object is inspected.

The Frame object is a frame for relative placement of a subsequent image processing object based on a position found in the previous image processing object. In this example, as an origin and settings in the Y-axis direction of a Frame01 object, a Geom01 object and a Geom02 object are respectively designated. Further, a SpectrumMatch01 object and a SpectrumMatch02 object are set to be mounted on the Frame01 object. Thereby, at execution, the SpectrumMatch01 object and the SpectrumMatch02 object are executed constantly in the same positions relative to positions of the Geom01 object and the Geom02 object.

Figure 3:
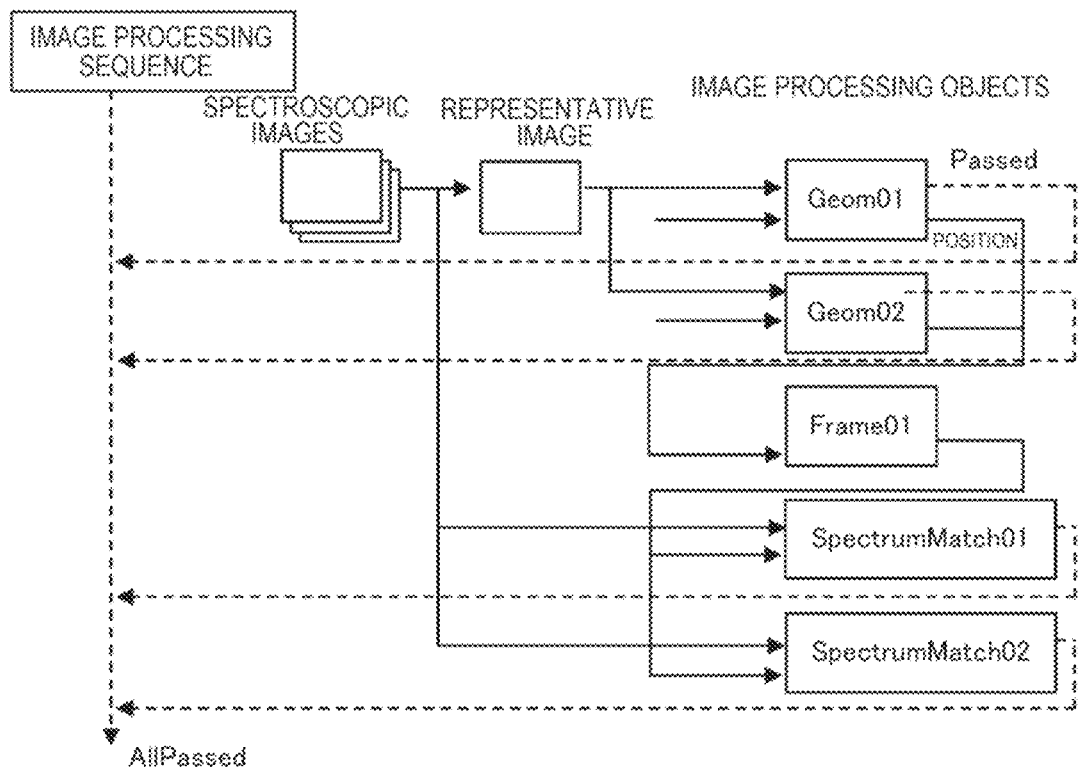
FIG. 3 shows a linkage between the image processing sequence and the image processing objects.

FIG. 3 shows the linkage between the image processing sequence and the image processing objects.

The image processing objects are the Geometric object, the Frame object, and the SpectrumMatch object. The image processing sequence executes the Geom01 object, the Geom02 object, the Frame01 object, the SpectrumMatch01 object, and the SpectrumMatch02 object on the representative image of the spectroscopic images and, when all of the objects are "Passed", returns "AllPassed".

Figure 4:
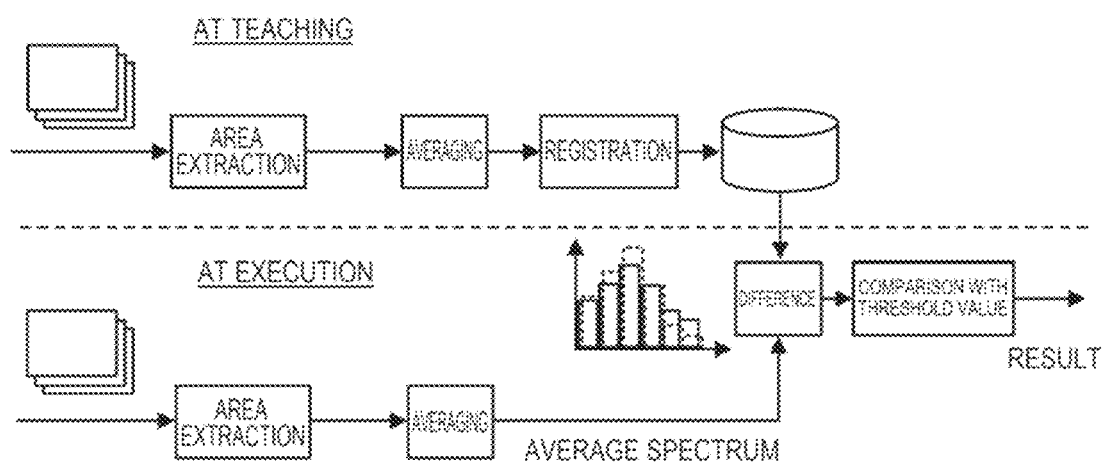
FIG. 4 shows a spectroscopic image inspection using a SpectrumMatch object.

FIG. 4 shows the spectroscopic image inspection using the SpectrumMatch object.

As shown in FIG. 4, with respect to the spectroscopic images, a sum of spectral luminance differences at respective wavelengths is compared with a threshold value. With respect to the spectroscopic images, a sum of spectral luminance differences at respective wavelengths between the time of teaching and the time of execution is compared with a threshold value. The spectroscopic images are a set of spectral images by imaging of the same object at different wavelengths.

Example 2

Figure 5:
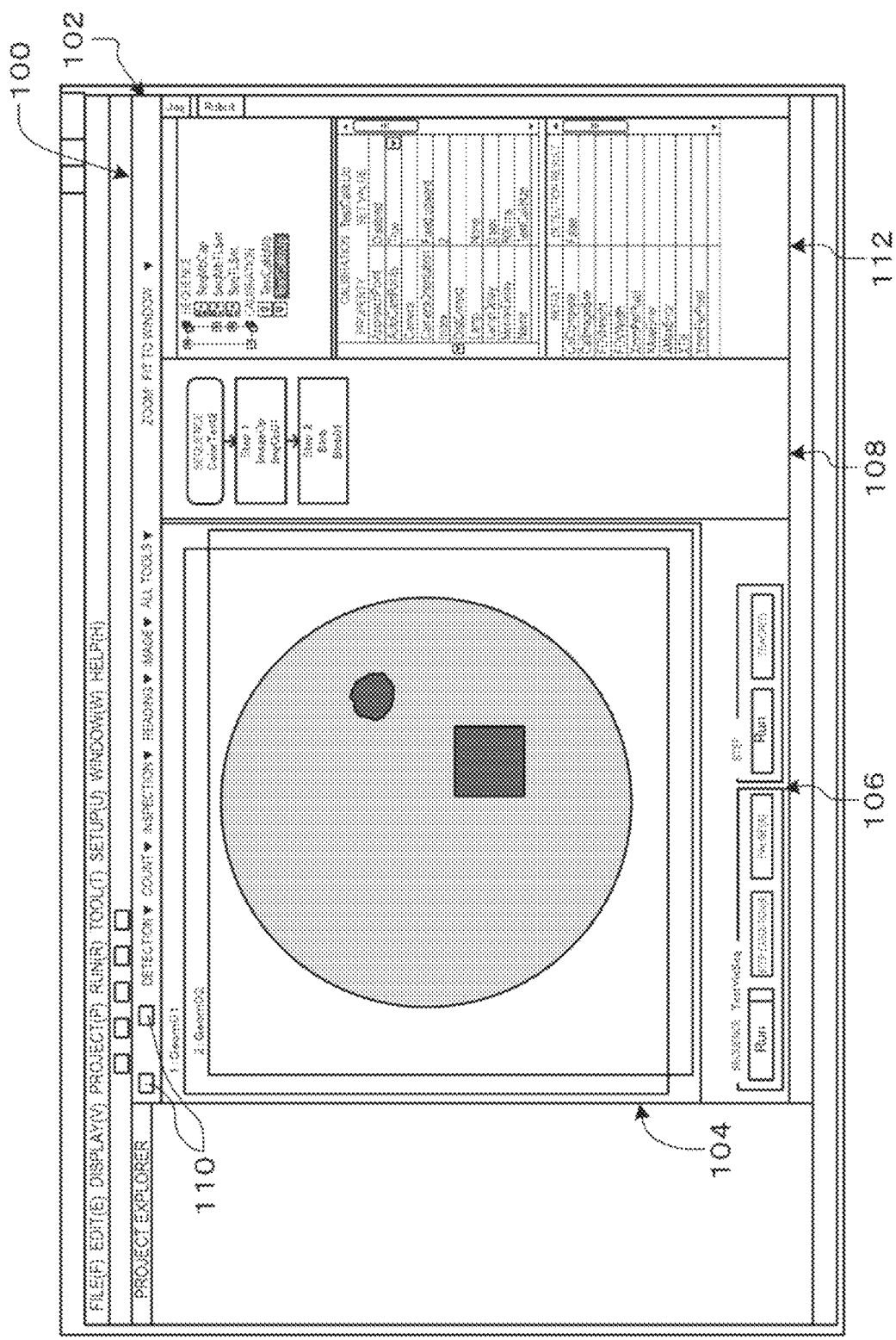
FIG. 5 shows examples of a setting window, an image processing sequence, and image processing objects of a robot vision system.

FIG. 5 shows the examples of the setting window, the image processing sequence, and the image processing objects of the robot vision system.

In this example, as shown in FIG. 5, an inspection is performed based on shapes of areas extracted by an ImageOp object and a Blob object.

The ImageOp object performs various image transforms. Basic image processing including smoothing, sharpening, binarization is provided. For the spectral camera 12A, the object has a function as a spectral pattern filter of extracting an area of pixels having spectra with smaller differences from the taught reference spectral data than threshold values taught in advance, copying a corresponding area of the representative image, and removing the other areas in a background color.

The Blob object extracts a block of areas with luminance within a set range. When there are a plurality of blocks, one of the blocks is selected by a set method, for example, the block having the maximum area is selected.

Figure 6:
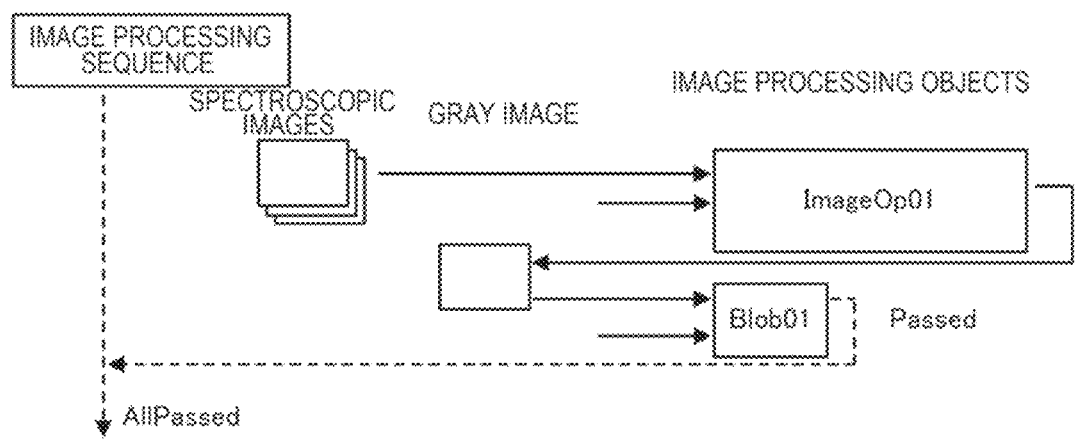
FIG. 6 shows a linkage between the image processing sequence and the image processing objects.

FIG. 6 shows the linkage between the image processing sequence and the image processing objects.

The image processing objects are the ImageOp object and the Blob object. As shown in FIG. 6, the image processing sequence executes an ImageOp01 object and a Blob01 object on the gray images of the spectroscopic images and, when all of the objects are "Passed", returns "AllPassed".

Figure 7:
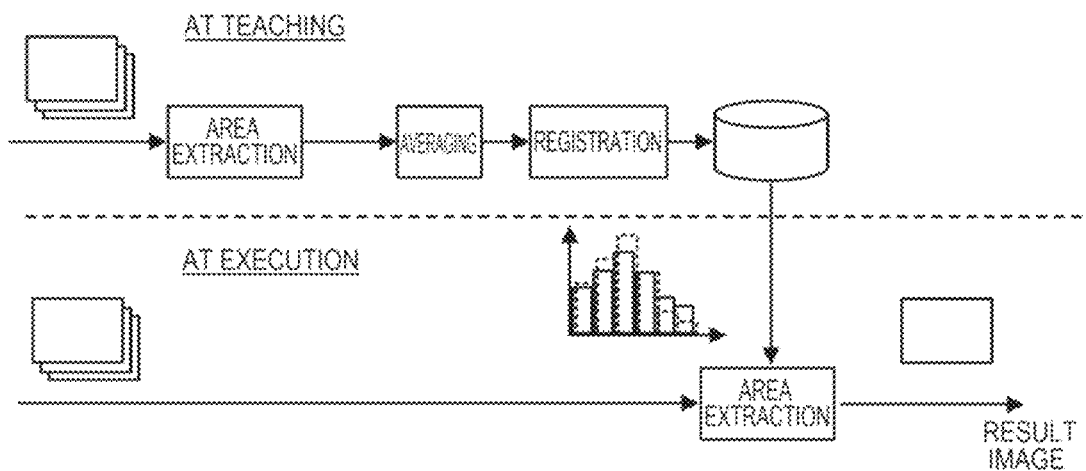
FIG. 7 shows operations of an ImageOp object.

FIG. 7 shows the operations of the ImageOp object.

As shown in FIG. 7, the ImageOp object area-extracts a part in which a difference from the spectrum registered at teaching is equal to or smaller than a threshold value from the representative image from among an entry window at execution and generates a result image.

Example 3

Figure 8:
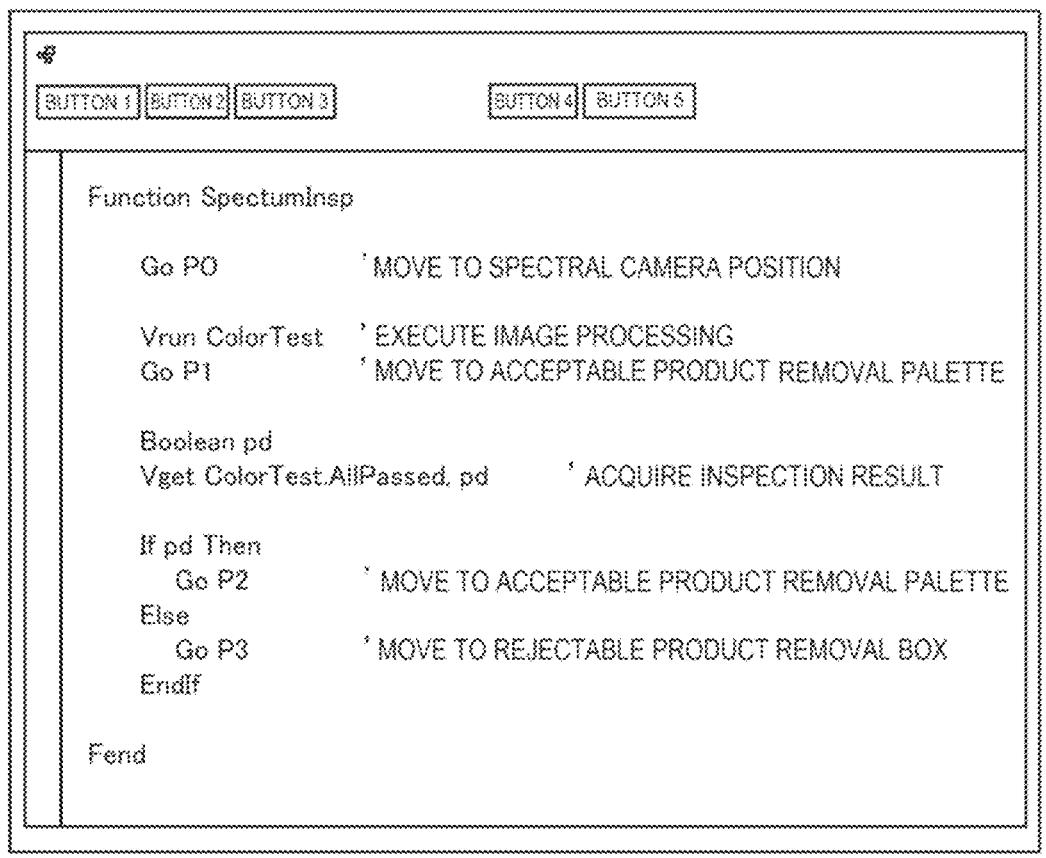
FIG. 8 shows an example of a program for moving a robot according to an execution result of image processing.

This example shows a cooperative operation of the robot control apparatus 20 and the robot 10.
Program and Execution FIG. 8 shows the example of the program for moving the robot 10 according to the execution result of image processing.

First, the robot control apparatus 20 moves the work W to a position of the spectral camera 12A.

Then, the image processing apparatus 22 executes image processing.

Then, the robot control apparatus 20 moves the work W to an acceptable product removal palette 152.

Then, the robot control apparatus 20 acquires an inspection result from the image processing apparatus 22 and, when the work W is acceptable, moves the work W onto the acceptable product removal palette 152. When the work W is rejectable, the apparatus moves the work W to a rejectable product removal palette 154.

An execution program is built in the computer 18 with the contents of the image processing sequence and sent to the robot control apparatus 20. In the control unit 42 within the robot control apparatus 20, the program is executed in response to a start command and the control of the robot 10, the image processing apparatus 22, and the spectral camera 12A is executed according to the program.

Figure 9:
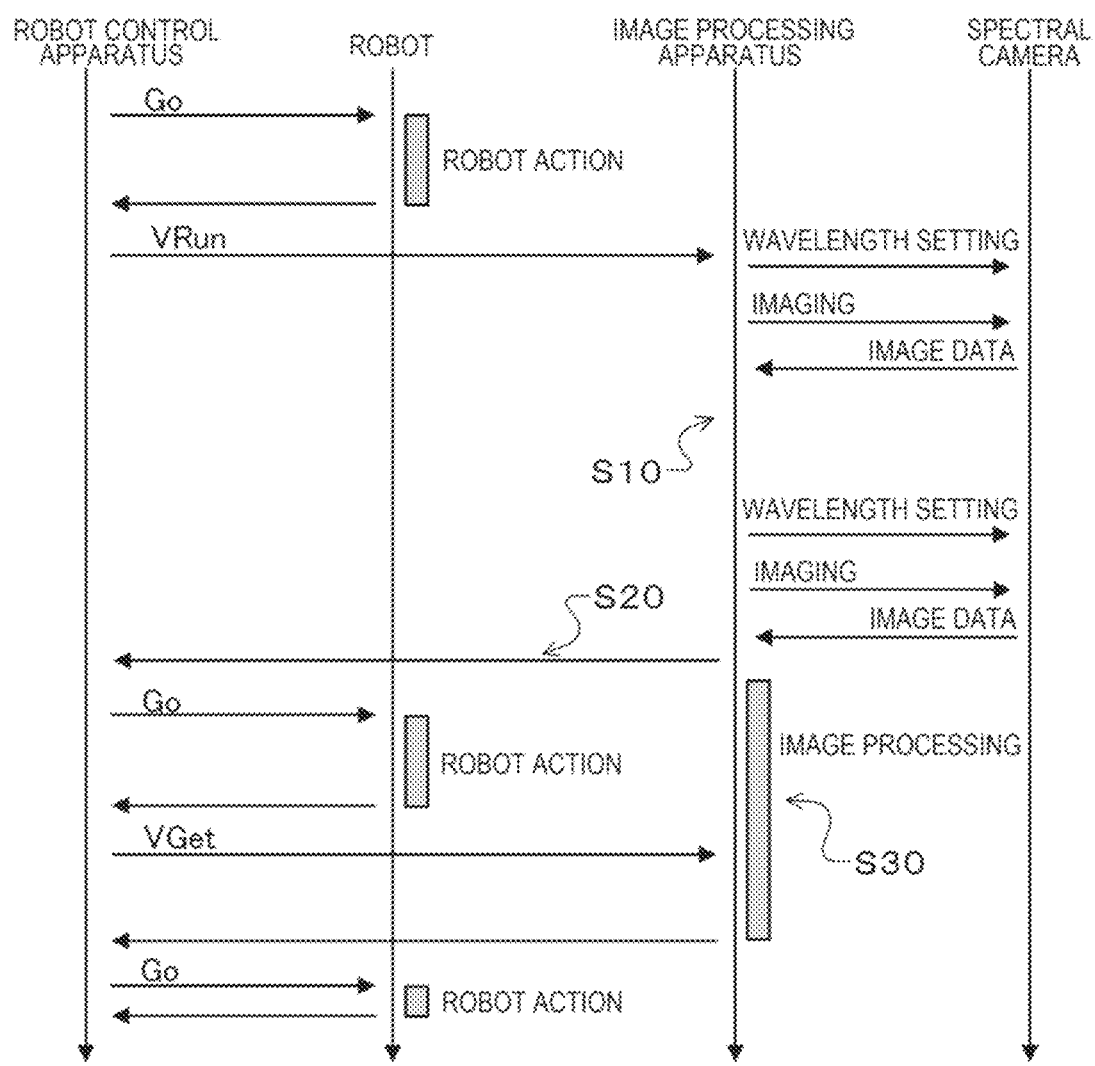
FIG. 9 shows a timing chart when the program is executed.

FIG. 9 shows the timing chart when the program is executed.

A Go command is executed on the robot 10 by the robot control apparatus 20. The robot 10 starts an action. An action result is returned from the robot 10 to the robot control apparatus 20.

A VRun command is executed on the image processing apparatus 22 by the robot control apparatus 20. From the image processing apparatus 22, imaging is started in the spectral camera 12A and, when capturing of images at necessary wavelengths, e.g. 16 images at e.g. 400 nm, 420 nm, . . . , 700 nm is finished, a processing result is returned form the image processing apparatus 22 to the robot control apparatus 20. The control is configured to be promptly returned to the robot control apparatus 20. The image processing in the image processing apparatus 22 is continuously performed.

A Go command is executed on the robot 10 by the robot control apparatus 20. The robot 10 starts an action. An action result is returned from the robot 10 to the robot control apparatus 20.

A VGet command is executed on the image processing apparatus 22 by the robot control apparatus 20. The VGet command waits until the image processing in the image processing apparatus 22 ends, and a processing result is returned from the image processing apparatus 22 to the robot control apparatus 20. The control is promptly returned to the robot control apparatus 20 when the image processing in the image processing apparatus 22 ended.

A Go command is executed on the robot 10 by the robot control apparatus 20. The robot 10 starts an action. An action result is returned from the robot 10 to the robot control apparatus 20.

As below, a spectroscopic inspection method performed by the robot vision system 2 will be explained.

A spectroscopic inspection method according to the embodiment is a method of inspecting the work W contained in the spectral image captured by the spectral camera 12A. The spectroscopic inspection method includes a setting step (not shown), an imaging step S10, a signal transmission step S20, and an inspection step S30.

In advance, at the setting step, the user sets the imaging step S10 and the inspection step S30 as one work procedure. Further, at the setting step, the setting part 70 sets a work procedure to execute the signal transmission step S20 of transmitting a signal for operation of the work W at the same time with the execution of the inspection step S30 after the imaging step S10 ends.

First, at the imaging step S10, the imaging unit control part 66 acquires a spectral image by imaging of the work W using the spectral camera 12A when the work W is located within an imaging range of the spectral camera 12A.

Then, at the signal transmission step S20, the communication unit 60 transmits a signal for operation of the work W at the same time with the execution of the inspection step S30 after the imaging step S10 ends.

Further, at the inspection step S30, the image processing sequence execution part 62 executes image processing on the spectral image and outputs a result of the image processing as an inspection result.

At the inspection step S30, the image processing sequence execution part 62 may output a difference between the spectral image and the reference spectral data as an inspection result. According to the configuration, the difference between the spectral image and the reference spectral data is output as the inspection result, and thereby, image processing on the spectral image may be easily performed.

The spectroscopic inspection method may include a teaching step (not shown). At the teaching step, teaching of the reference spectral data used for image processing is received in advance.

The reference spectral data may contain threshold values for the respective wavelengths contained in the spectral image. At the inspection step S30, a determination may be made based on a sum of differences between the spectral luminance and the threshold values at the respective wavelengths contained in the spectral image, and a determination result may be output as an inspection result. According to the configuration, the determination is made based on the sum of the differences between the spectral luminance and the threshold values at the respective wavelengths contained in the spectral image and the determination result is output as the inspection result, and thereby, image processing on the spectral image may be easily performed.

The reference spectral data may include a plurality of wavelengths contained in a wavelength band of visible light. The plurality of wavelengths may be e.g. respective wavelengths contained in the wavelength band of visible light divided in 16 ranges. According to the configuration, the reference spectral data includes the plurality of wavelengths contained in the wavelength band of visible light, and thereby, accurate image processing on the spectral image may be performed.

The reference spectral data may contain threshold values for the respective wavelengths contained in the spectral image. The image processing may extract pixels having spectra smaller than the threshold values as an extracted area and output the extracted area based on the coordinate system of the representative image as an inspection result. According to the configuration, the pixels having the spectra smaller than the threshold values are extracted as the extracted area and the extracted area based on the coordinate system of the representative image is output as the inspection result, and thereby, accurate image processing may be performed.

The image processing may include processing of creating a grayscale image from the spectral image and setting the image as the representative image. According to the configuration, the processing includes creating the grayscale image from the spectral image and setting the image as the representative image, and thereby, a preferable edge quantity may be calculated from the grayscale image. Therefore, edge enhancement processing is performed based on the preferable edge quantity, and thereby, sharpness of characters and lines may be improved.

The image processing may set a predetermined coordinate system in the representative image and output a difference between a spectrum of a pixel in a position based on the coordinate system and the reference spectral data as an inspection result. According to the configuration, the difference between the spectrum of the pixel in the position based on the coordinate system and the reference spectral data is output as the inspection result, and thereby, accurate image processing may be performed.

The image processing may output shape information of the extracted area as an inspection result. According to the configuration, the shape information of the extracted area is output as the inspection result, and thereby, accurate image processing may be performed.

Example of User Application

FIG. 10 is the placement diagram showing the system for sorting the works W into acceptable products and rejectable products.

As shown in FIG. 10, the robot vision system 2 includes the robot 10, the acceptable product removal palette 152, the rejectable product removal palette 154, the robot camera 12B, a suction hand 156, and the spectral camera 12A. The robot vision system 2 is a system of picking up the works W arranged on a feed palette 158 one by one using the suction hand 156 of the robot 10, performing color inspection of small parts 164 attached to the back surfaces of the works W, and separating the works W into acceptable products and rejectable products.

Figure 11:
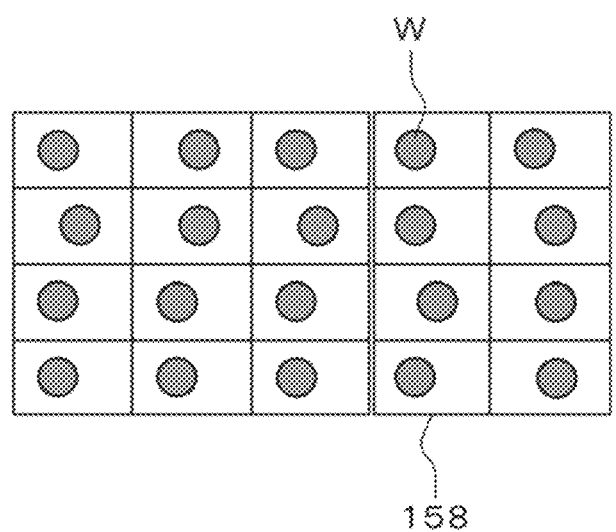
FIG. 11 shows works arranged on a feed palette.

FIG. 11 shows the works W arranged on the feed palette 158.

As shown in FIG. 11, the works W are arranged on the feed palette 158. The front surfaces of the works W are seen from the robot camera 12B. The back surfaces of the works W are not seen from the robot camera 12B. The works W separated in cells of the feed palette 158 vary in placement positions in the cells. The robot 10 may drop the work W during transfer unless the suction hand 156 suctions the center of the surface of the work W.

Figure 12:
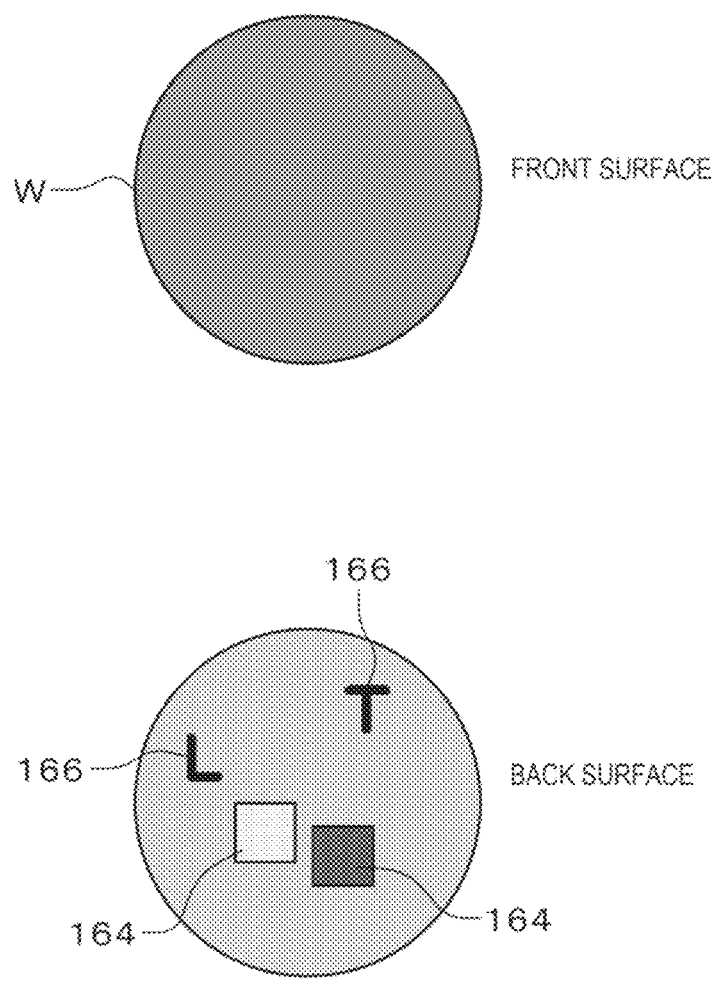
FIG. 12 shows a front surface and a back surface of the work.

FIG. 12 shows the front surface and the back surface of the work W.

As shown in FIG. 12, the work W has the front surface and the back surface. Objects to be inspected are the two small parts 164 provided on the back surface of the work W. The robot 10 does not know in which directions the small parts 164 on the back surface of the work W face if the front surface of the work W is imaged using the robot camera 12B.

Flow Realized by User

The robot camera 12B is set to have a visual field slightly larger than the single cell of the feed palette 158. Further, a relationship between the position of the suction hand 156 and coordinates of the image is calibrated in advance.

Feeding

First, the robot 10 moves so that the next work W may enter the visual field of the robot camera 12B, finds the circular work W, and suctions the center of the work W with the suction hand 156.

Then, the robot 10 moves the work W to a position within a visual field of the spectral camera 12A. Here, the robot 10 stops with the work W suctioned.

Inspection

Then, the image processing apparatus 22 specifies positions of the small parts 164 on the back surface of the work W using marks 166 as reference and performs a spectroscopic inspection. The image processing apparatus images the back surface of the work W containing the small parts 164, performs inspection processing by spectral image using the image, and judges pass/fail of the work W.

Removal

Then, the robot 10 starts to move with the suctioned work W toward above the cell of the acceptable product removal palette 152 in which the work is next to be placed at the time when imaging by the spectral camera 12A is finished. During transfer, the image processing apparatus 22 performs inspection processing and makes a judgement of pass/fail and, if the work is acceptable, the robot 10 changes the transfer destination of the suctioned work W above the rejectable product removal palette 154 and places the suctioned work W onto the rejectable product removal palette 154. If the work is acceptable, the robot does not change the transfer destination of the suctioned work W, but places the suctioned work W onto the acceptable product removal palette 152.

The above described process is repeatedly performed until no work W remains on the feed palette 158.

Development of User Program

First, a program for moving the positions of the cells of the feed palette 158 and the cells of the acceptable product removal palette 152 one after another and repeating the movement at a side of calling a SpectrumInsp object is created.

Then, a start point of the feed palette 158 of a robot point, the position of the spectral camera 12A, a start point of the acceptable product removal palette 152, and a position of the rejectable product removal palette 154 are registered.

Then, two image processing sequences are created. The first sequence is a sequence for executing one Geometric object having a circular model on the front surface using the robot camera 12B attached to the robot 10. The Geometric object is configured to return center coordinates of the circle. The second sequence is a sequence for spectroscopic inspection using the spectral camera 12A facing upward. This sequence is the above described example.

Then, a camera calibration is executed. Thereby, camera coordinates of the first sequence are associated with the position of the suction hand 156 of the robot 10.

Execution of User Program

Figure 13:
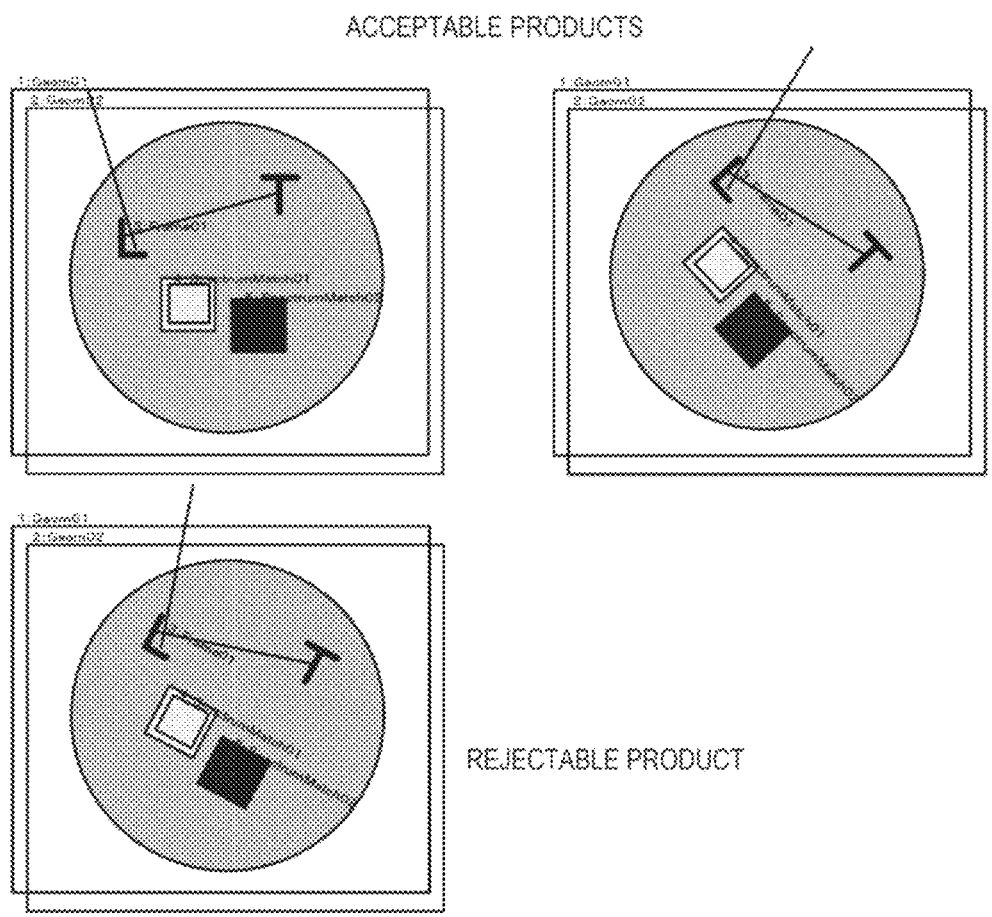
FIG. 13 shows execution results of the image processing sequence.

FIG. 13 shows the execution results of the image processing sequence.

When a program is built and executed, image processing and an action of the robot 10 are performed in parallel. The execution result of the image processing sequence changes as follows according to the circumstances. For example, the rejectable product is displayed in red.

In response to the result, the upper two acceptable works are placed on the acceptable product removal palette 152 and the lower rejectable work is sorted onto the rejectable product removal palette 154.

Inspection Program to be Changed

Figure 14:
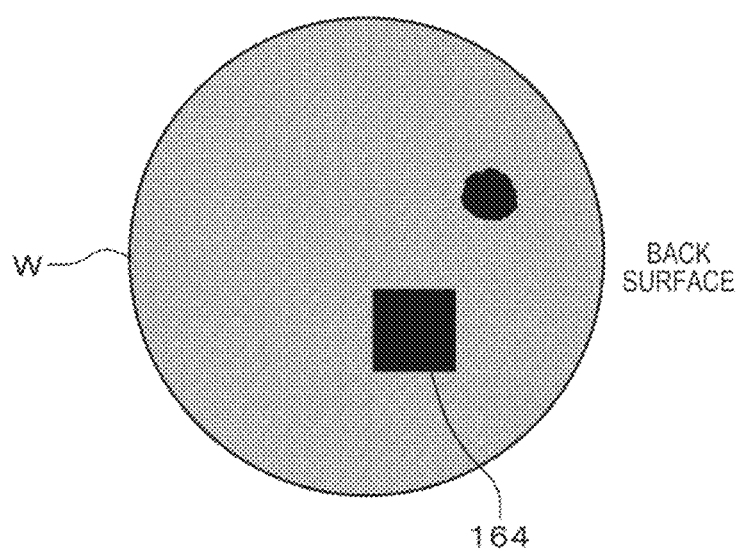
FIG. 14 shows a back surface of another type of product.
Figure 15:
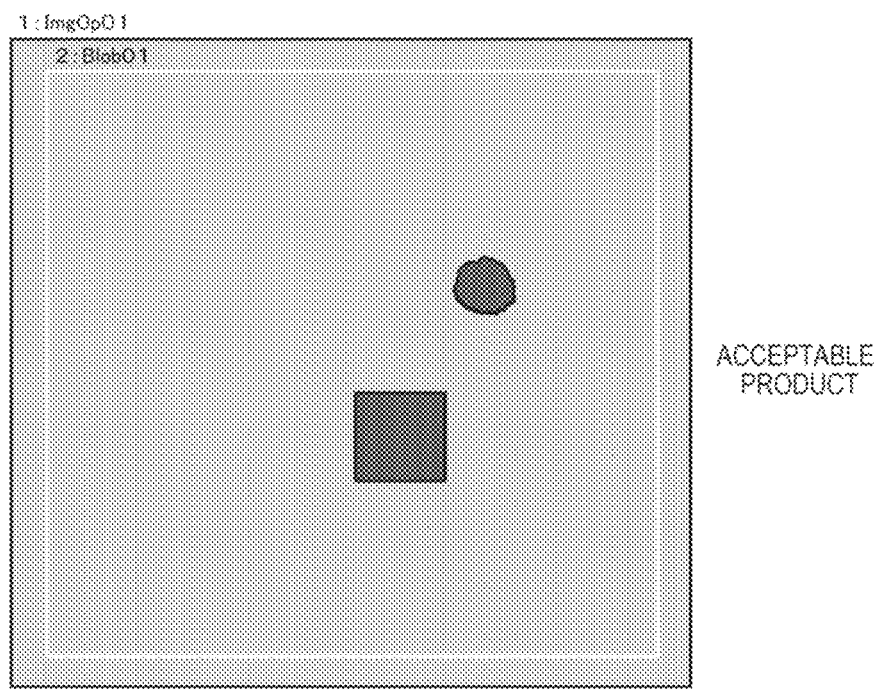
FIG. 15 shows execution results of the other type of products.
Figure 15:
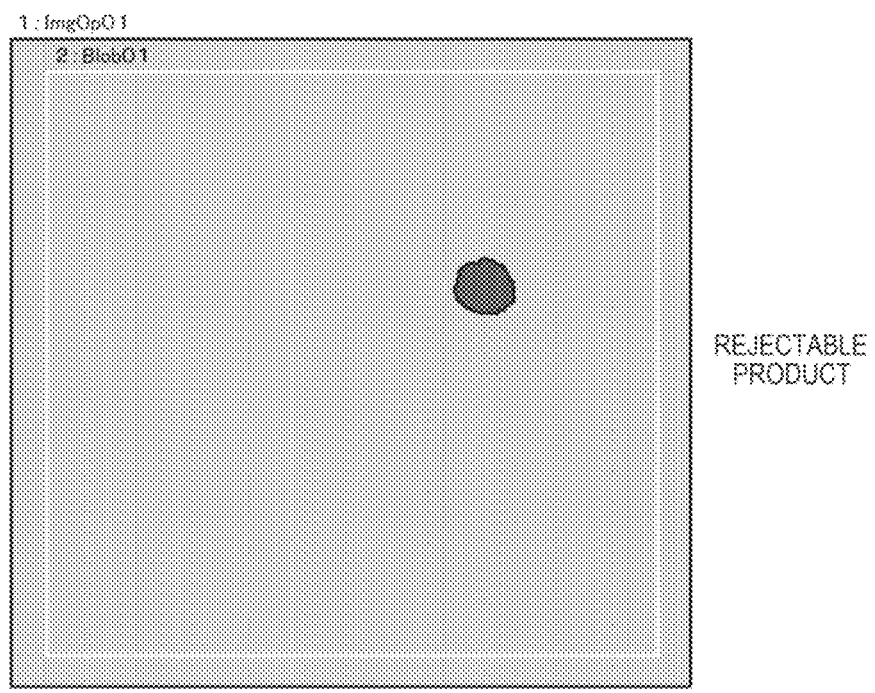

FIG. 14 shows a back surface of another type of product. FIG. 15 shows execution results of the other type of products.

As shown in FIG. 14, when the type of product is changed, and the back surface has the following layout and an inspection point is only the presence of a square, the change may be addressed in a short time by modification of the image processing sequence. The execution results in this case are shown in FIG. 15. The upper result shows an acceptable product and the lower result shows a rejectable product.

According to the example, the program for individually teaching imaging, inspection, and robot action may be prevented from being complex.

According to the embodiment, with respect to the execution of the image processing sequence execution part 62, the communication unit 60 may be executed at the time when the imaging unit control part 66 ends without waiting for the end of the image processing sequence execution part 62. Thereby, the image processing apparatus 22 with reduced takt time may be provided.

Further, with respect to the execution of the inspection step S30, the signal transmission step S20 may be executed at the time when the imaging step S10 ends without waiting for the end of the inspection step S30. Thereby, the spectroscopic inspection method with reduced takt time may be provided.

As below, details derived from the embodiment will be described.

A spectroscopic inspection method is a spectroscopic inspection method of performing an inspection using a spectral image of an object captured by a spectral camera, including an imaging step of imaging the object within an imaging range of the spectral camera using the spectral camera and acquiring the spectral image, an inspection step of executing image processing on the spectral image and outputting a result of the image processing as an inspection result, a signal transmission step of transmitting a signal for operation of the object based on the inspection result, and a setting step of setting a work procedure of the imaging step, the inspection step, and the signal transmission step, wherein the setting step sets the work procedure to execute the inspection step after the imaging step ends and execute the signal transmission step after the imaging step ends and before the inspection step ends.

According to the configuration, with respect to the execution of the inspection step, the signal transmission step may be executed at the time when the imaging step ends without waiting for the end of the inspection step. Thereby, the spectroscopic inspection method with reduced takt time may be provided.

In the above described spectroscopic inspection method, it is preferable that a teaching step of receiving teaching of reference spectral data used for the image processing in advance is provided, wherein the inspection step outputs a difference between the spectral image and the reference spectral data as the inspection result.

According to the configuration, the difference between the spectral image and the reference spectral data is output as the inspection result, and thereby, image processing on the spectral image may be easily performed.

In the above described spectroscopic inspection method, it is preferable that the reference spectral data includes threshold values for respective wavelengths contained in the spectral image, and the inspection step outputs a result of a judgement based on a sum of differences between spectral luminance and the threshold values for the respective wavelengths contained in the spectral image as the inspection result.

According to the configuration, a determination is made based on the sum of differences between the spectral luminance and the threshold values at the respective wavelengths contained in the spectral image and the determination result is output as the inspection result, and thereby, image processing on the spectral image may be easily performed.

In the above described spectroscopic inspection method, it is preferable that the reference spectral data includes a plurality of wavelengths contained in a wavelength band of visible light.

According to the configuration, the reference spectral data includes the plurality of wavelengths contained in the wavelength band of visible light, and thereby, accurate image processing on the spectral image may be performed.

In the above described spectroscopic inspection method, it is preferable that the image processing includes processing of creating a grayscale image from the spectral image and setting the image as a representative image.

According to the configuration, the processing includes creating the grayscale image from the spectral image and setting the image as the representative image, and thereby, a preferable edge quantity may be calculated from the grayscale image. Therefore, edge enhancement processing is performed based on the preferable edge quantity, and thereby, sharpness of characters and lines may be improved.

In the above described spectroscopic inspection method, it is preferable that the image processing sets a predetermined coordinate system in the representative image and outputs a difference between a spectrum of a pixel in a position based on the coordinate system and the reference spectral data as the inspection result.

According to the configuration, the difference between the spectrum of the pixel in the position based on the coordinate system and the reference spectral data is output as the inspection result, and thereby, accurate image processing may be performed.

In the above described spectroscopic inspection method, it is preferable that the reference spectral data includes threshold values for respective wavelengths contained in the spectral image, and the image processing extracts pixels having the spectra smaller than the threshold values as an extracted area, and outputs the extracted area based on the coordinate system of the representative image as the inspection result.

According to the configuration, the pixels having the spectra smaller than the threshold values are extracted as the extracted area and the extracted area based on the coordinate system of the representative image is output as the inspection result, and thereby, accurate image processing may be performed.

In the above described spectroscopic inspection method, it is preferable that the image processing outputs shape information of the extracted area as the inspection result.

According to the configuration, the shape information of the extracted area is output as the inspection result, and thereby, accurate image processing may be performed.

An image processing apparatus is an image processing apparatus that performs an inspection using a spectral image of an object captured by a spectral camera, including an imaging unit control part that executes imaging processing of imaging the object within an imaging range of the spectral camera using the spectral camera and acquiring the spectral image, an inspection part that executes inspection processing of executing image processing on the spectral image and outputting a result of the image processing as an inspection result, a communication unit that executes transmission processing of transmitting a signal for operation of the object based on the inspection result, and a setting part of setting a work procedure of the imaging processing, the inspection processing, and the transmission processing, wherein the setting part sets the work procedure to execute the inspection processing after the imaging processing ends and execute the transmission processing after the imaging processing ends and before the inspection processing ends.

According to the configuration, with respect to the execution of the inspection part, the signal transmission part may be executed at the time when the imaging unit ends without waiting for the end of the inspection part. Thereby, the image processing apparatus with reduced takt time may be provided.

A robot system of this application includes a robot, the above described image processing apparatus, and a control apparatus that controls the robot based on the inspection result of the image processing apparatus.

According to the configuration, in the image processing apparatus, with respect to the execution of the inspection part, the signal transmission part may be executed at the time when the imaging unit ends without waiting for the end of the inspection part. Thereby, the robot system with reduced takt time may be provided.

What is claimed is:

1. A spectroscopic inspection method of performing an inspection using a spectral image of an object captured by a spectral camera, comprising:
   an imaging step of imaging the object within an imaging range of the spectral camera using the spectral camera and acquiring the spectral image;
   an inspection step of executing image processing on the spectral image and outputting a result of the image processing as an inspection result;
   a signal transmission step of transmitting a signal for operation of the object based on the inspection result; and
   a setting step of setting a work procedure of the imaging step, the inspection step, and the signal transmission step, wherein
   the setting step sets the work procedure to execute the inspection step after the imaging step ends and execute the signal transmission step after the imaging step ends and before the inspection step ends.

2. The spectroscopic inspection method according to claim 1, further comprising a teaching step of receiving teaching of reference spectral data used for the image processing in advance, wherein
   the inspection step outputs a difference between the spectral image and the reference spectral data as the inspection result.

3. The spectroscopic inspection method according to claim 2, wherein
   the reference spectral data includes threshold values for respective wavelengths contained in the spectral image, and
   the inspection step outputs a result of a judgement based on a sum of differences between spectral luminance and the threshold values for the respective wavelengths contained in the spectral image as the inspection result.

4. The spectroscopic inspection method according to claim 2, wherein
   the reference spectral data includes a plurality of wavelengths contained in a wavelength band of visible light.

5. The spectroscopic inspection method according to claim 2, wherein
   the image processing includes processing of creating a grayscale image from the spectral image and setting the image as a representative image.

6. The spectroscopic inspection method according to claim 5, wherein
   the image processing sets a predetermined coordinate system in the representative image and outputs a difference between a spectrum of a pixel in a position based on the coordinate system and the reference spectral data as the inspection result.

7. The spectroscopic inspection method according to claim 6, wherein
   the reference spectral data includes threshold values for respective wavelengths contained in the spectral image, and
   the image processing extracts pixels having the spectra smaller than the threshold values as an extracted area, and outputs the extracted area based on the coordinate system of the representative image as the inspection result.

8. The spectroscopic inspection method according to claim 7, wherein
   the image processing outputs shape information of the extracted area as the inspection result.

9. An image processing apparatus that performs an inspection using a spectral image of an object captured by a spectral camera, comprising:
   an imaging unit control part that executes imaging processing of imaging the object within an imaging range of the spectral camera using the spectral camera and acquiring the spectral image;
   an inspection part that executes inspection processing of executing image processing on the spectral image and outputting a result of the image processing as an inspection result;
   a communication unit that executes transmission processing of transmitting a signal for operation of the object based on the inspection result; and
   a setting part of setting a work procedure of the imaging processing, the inspection processing, and the transmission processing, wherein
   the setting part sets the work procedure to execute the inspection processing after the imaging processing ends and execute the transmission processing after the imaging processing ends and before the inspection processing ends.

10. A robot system comprising:
    a robot;
    the image processing apparatus according to claim 9; and
    a control apparatus that controls the robot based on the inspection result of the image processing apparatus.

* * * * *